US009163662B2

(12) United States Patent
Rousselin et al.

(10) Patent No.: US 9,163,662 B2
(45) Date of Patent: Oct. 20, 2015

(54) INSTALLATION OF CALIBRATION GAUGE FOR MEASURING CONSTRAINTS

(71) Applicant: SNECMA, Paris (FR)

(72) Inventors: Stephane Rousselin, Hericy (FR); Pascal Brunel, Moissy-Cramayel (FR); Sylvie Charles, Les Ecrennes (FR); Frederic Patard, Corbeil (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/246,603

(22) Filed: Apr. 7, 2014

(65) Prior Publication Data
US 2014/0307992 A1 Oct. 16, 2014

(30) Foreign Application Priority Data
Apr. 8, 2013 (FR) ...................................... 13 53133

(51) Int. Cl.
  *F16C 19/36* (2006.01)
  *F16C 43/04* (2006.01)
  *F16C 33/30* (2006.01)
  *G01B 1/00* (2006.01)
  *F16C 19/26* (2006.01)
  *G01L 25/00* (2006.01)
  *G01M 13/04* (2006.01)

(52) U.S. Cl.
  CPC ................. *F16C 19/26* (2013.01); *G01L 25/00* (2013.01); *G01M 13/04* (2013.01)

(58) Field of Classification Search
  CPC ........ F16C 19/364; F16C 19/46; F16C 19/49; F16C 19/505; F16C 33/581; G01L 25/00; G01M 13/04
  USPC ......... 384/543, 548, 559, 565, 569, 571, 586, 384/609, 617, 564, 590; 73/114.81, 760; 33/517
  See application file for complete search history.

(56) References Cited

U.S. PATENT DOCUMENTS

| 2,539,578 A | 1/1951 | Headley |
| 3,040,560 A | 6/1962 | Stupp |
| 3,129,641 A * | 4/1964 | Walter ........................... 409/238 |

(Continued)

FOREIGN PATENT DOCUMENTS

| CN | 201247149 Y | 5/2009 |
| CN | 203324014 U | 12/2013 |
| CN | 203350039 U | 12/2013 |
| DE | 10 2004 048 633 A1 | 4/2006 |

(Continued)

OTHER PUBLICATIONS

Search Report issued Sep. 22, 2014 in United Kingdom Patent Application No. GB1406322.6.

(Continued)

*Primary Examiner* — Marcus Charles
(74) *Attorney, Agent, or Firm* — Oblon, McClelland, Maier & Neustadt, L.L.P.

(57) ABSTRACT

An installation for calibration of a stress gauge for an external bearing block of a turbomachine roller bearing, the bearing block including a radially internal roller bearing race. The installation includes a support table on which the bearing block is attached; an internal roller bearing ring mounted coaxial with the bearing block; a drive shaft driving the ring. The installation also includes a device for applying an axial stress to the bearing block including a support drum on which the internal ring is removably fixed and a connection with the device for applying the axial stress.

10 Claims, 3 Drawing Sheets

(56) References Cited

U.S. PATENT DOCUMENTS

| | | | |
|---|---|---|---|
| 3,683,673 A | | 8/1972 | Eichler et al. |
| 3,751,621 A | * | 8/1973 | Maier .......................... 219/103 |
| 4,232,838 A | * | 11/1980 | Bravin ......................... 242/481 |
| 4,685,364 A | * | 8/1987 | Scheflow et al. ................ 83/68 |
| 5,020,357 A | | 6/1991 | Kovacevic et al. |
| 6,591,669 B1 | * | 7/2003 | Serra et al. ..................... 73/146 |
| 8,051,952 B2 | | 11/2011 | Bart et al. |
| 2012/0055137 A1 | | 3/2012 | Bouiller et al. |

FOREIGN PATENT DOCUMENTS

| | | | | |
|---|---|---|---|---|
| DE | 102008038067 A1 | * | 2/2010 | ............ F16C 19/184 |
| GB | 663419 A | * | 12/1951 | .............. B24B 13/04 |
| GB | 1447215 A | * | 8/1976 | |

OTHER PUBLICATIONS

French Preliminary Search Report issued Apr. 16, 2014, in French Patent Application No. FR 1353133 (FA 790513) (with English machine translation).

* cited by examiner

INSTALLATION OF CALIBRATION GAUGE FOR MEASURING CONSTRAINTS

TECHNICAL FIELD

The invention relates to an installation for calibration of a stress gauge for installation on a turbomachine shaft guide bearing block.

The invention is more particularly applicable to a stress gauge calibration installation that reduces the risks of misalignment of the different components of the installation when replacing a calibration part.

STATE OF PRIOR ART

During turbomachine tests, a plurality of sensors and gauges are installed on different components of the turbomachine to determine the stresses applied to these components.

These components include an external bearing block of a turbomachine main shaft rotation guide roller bearing on which a stress gauge is installed.

The stress gauge has to be calibrated before the turbomachine test can be carried out, to determine the range of stresses on the bearing block as precisely as possible.

According to one known embodiment, the gauge calibration installation comprises a fixed support onto which the bearing block on which the gauge is fixed is attached, and a system for stressing the bearing block that consists of applying an axial force on the bearing block by means of an internal bearing ring, and making this ring rotate about the principal axis of the bearing block.

The internal ring comprises a conical face through which the axial force is applied on the bearing block, the angle of inclination of this conical face modifying the orientation of the force applied on the bearing block. Thus, the gauge can be calibrated using several internal rings with conical faces with different angles of inclination, in sequence, and modifying the amplitude of the applied axial force.

The internal ring is mounted on a central shaft that is subjected to an axial force and which is driven in rotation about the principal axis of the bearing block.

The different internal rings are mounted on the central shaft in sequence during the gauge calibration process, which means that part of the installation has to be disassembled and then reassembled several times.

These successive disassemblies of the installation modify the alignment of its components, thus disturbing calibration of the gauge.

The purpose of the invention is to disclose a stress gauge calibration installation designed so as to limit alignment defects between the components of the installation and to guarantee good calibration quality.

PRESENTATION OF THE INVENTION

The invention discloses an installation for calibration of a stress gauge for an external bearing block of a turbomachine roller bearing, said bearing block comprising a radially internal roller bearing race, the installation comprising a support table on which the bearing block supporting the gauge is attached; an internal roller bearing ring that is mounted coaxial with the bearing block that comprises a conical external face and that is bearing in contact with the roller bearing race through several balls or rollers; a drive shaft driving the ring in rotation about the principal axis of the bearing block; means of applying an axial stress to the bearing block, characterised in that it comprises a support drum on which the internal ring is removably fixed, that comprises means for coupling it in rotation with the drive shaft and means of connection with the axial stress application means.

The use of a support drum to connect the internal ring with the drive shaft and the axial stress application means limit the number of the components that have to be disassembled when changing two internal rings.

Thus, some elements remain connected to the support drum that subsequently enables good repositioning of elements that have been disassembled.

Preferably, the support drum is mounted free to slide in the axial direction along the principal axis of the bearing block relative to the rotational drive shaft and is mounted free to rotate about the principal axis of the bearing block relative to the axial stress application means.

Preferably, the means of coupling the support drum with the drive shaft are of the key or spline type.

Preferably, the means of connecting the support drum with the axial stress application means comprise a roller bearing capable of resisting an axial load arranged between the support drum and the axial stress application means.

Preferably, the support drum comprises a cylindrical portion coaxial with the principal axis of the bearing block, one end of which supports coupling means with the drive shaft and the second end of which supports means of connection with the axial stress application means, and comprises an annular rib projecting radially outwards from the second end of the cylindrical portion on which the internal ring is mounted.

Preferably, the axial stress application means comprise a tension jack that is arranged coaxially with the principal axis of the bearing block.

Preferably, the installation also comprises an attachment plate parallel to the support table located at a distance from the support table along the axial direction of the bearing block and that supports means of connection with the axial stress application means.

Preferably, the means of connection with the axial stress application means include a ball joint.

Preferably, the ball joint means are mounted on the attachment table through a support plate for which the position on the attachment table can be adjusted.

Preferably, the support table and the attachment plate are oriented horizontally and the principal axis of the bearing block is oriented vertically, with reference to the gravity.

BRIEF DESCRIPTION OF THE DRAWINGS

Other characteristics and advantages of the invention will become clear after reading the following detailed description made with reference to the appended figures among which.

DETAILED PRESENTATION OF PARTICULAR EMBODIMENTS

Figure 1:
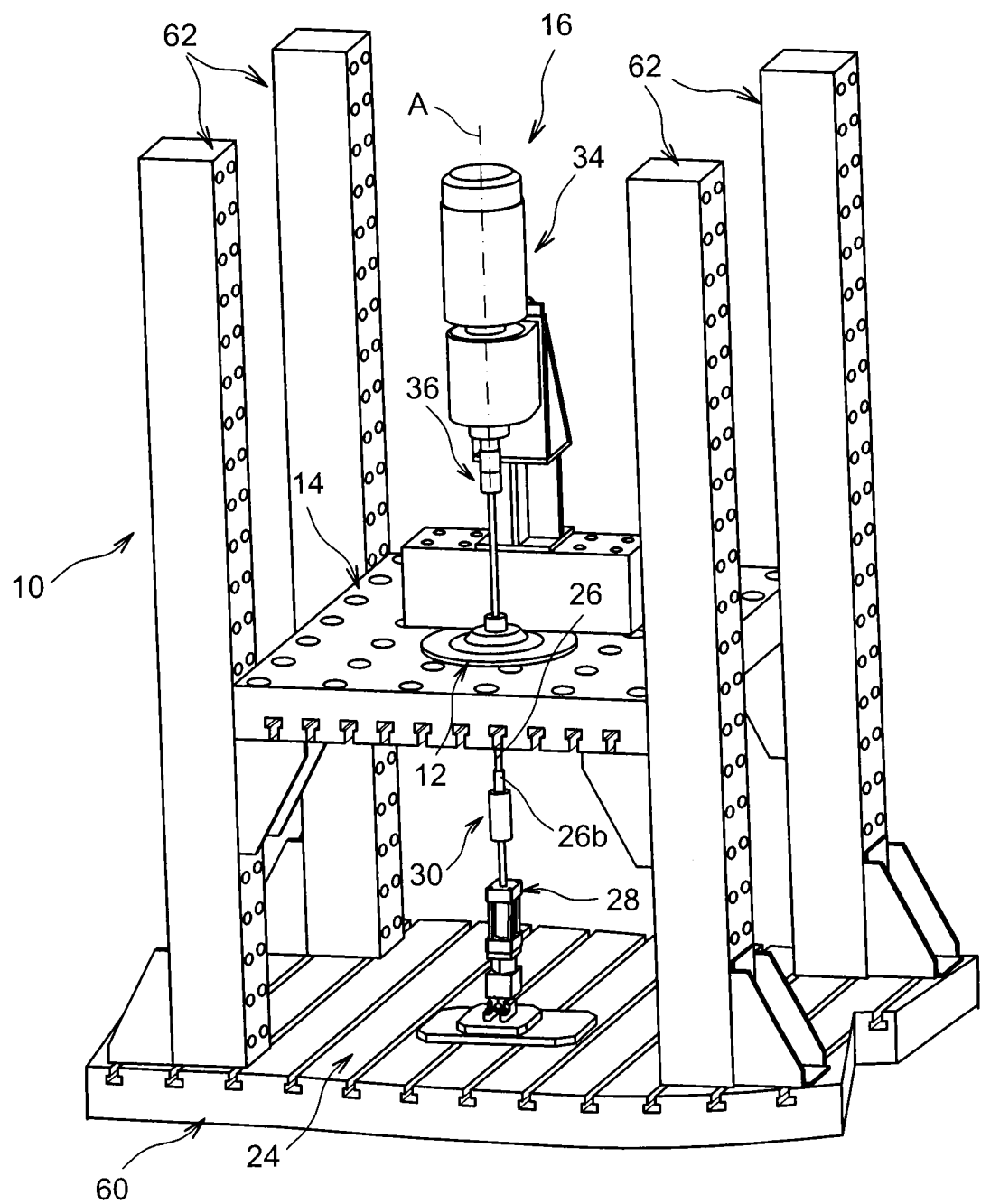
FIG. 1 is a diagrammatic perspective view of an installation for calibration of a stress gauge according to the invention.
Figure 2:
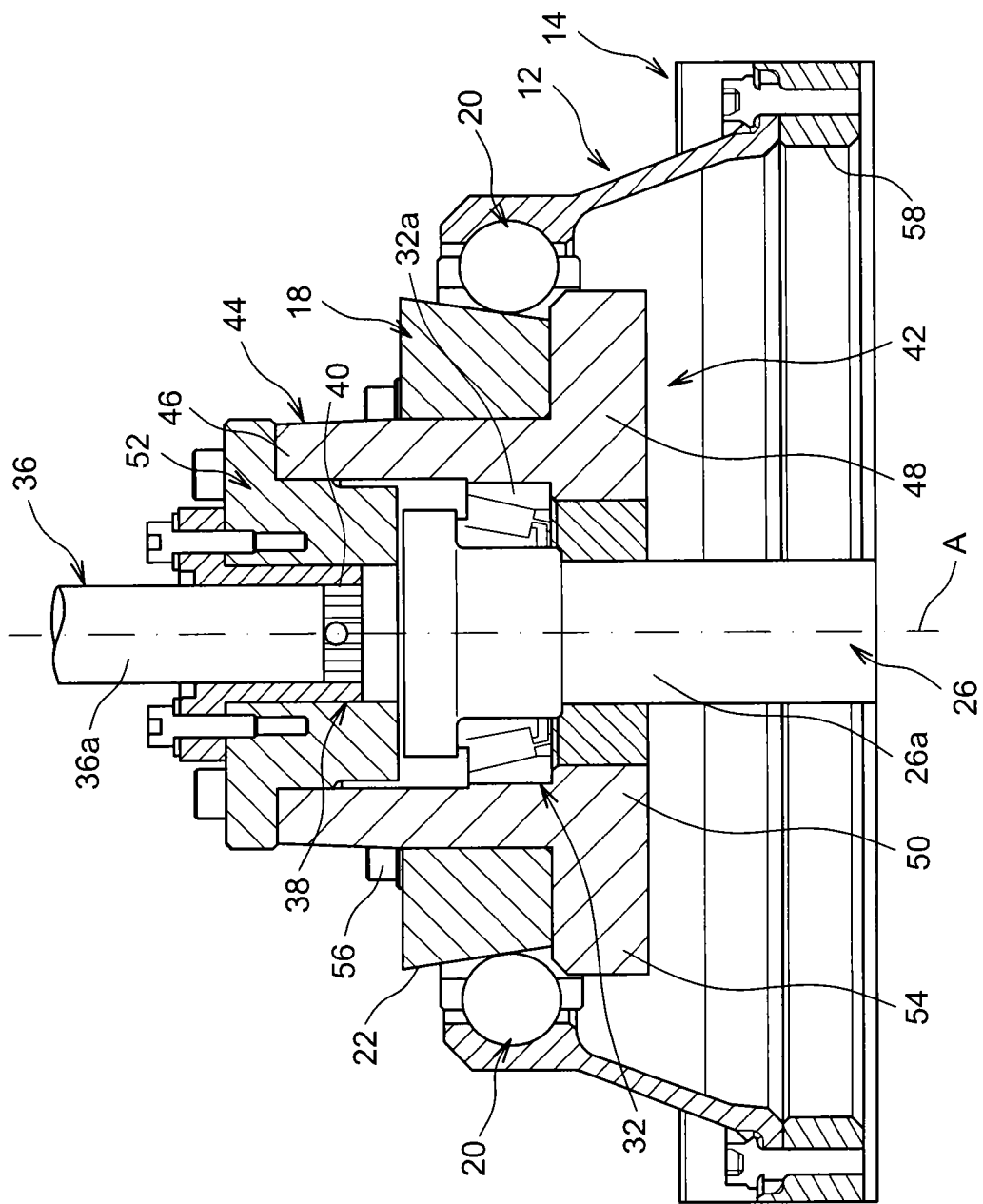
FIG. 2 is a larger scale axial sectional view showing the connection between the bearing block and the drive means.

In the following description, identical, similar or corresponding elements will be designated with the same reference numbers.

The figures show an installation 10 for calibration of a gauge for measurement of stresses applied to a bearing block 12 of a turbomachine roller bearing.

The bearing block 12 forms the radially external part of a roller bearing, particularly a ball bearing.

The installation 10 comprises a support table 14 on which the bearing block 12 is mounted and means of applying stress 16 to the bearing block 12 that simulate an axial stress rotating about the principal axis of the bearing block 12.

The means 16 of applying stress to the bearing block 12 have a principal axis A that is coaxial with the principal axis of the bearing block 12. This principal axis A is preferably oriented vertically with reference to gravity. As a variant, the principal axis A may be oriented differently, for example horizontally.

The function of the stress application means 16 is to apply a load on the bearing block 12 oriented in the axial and radial directions, and making this load rotate relative to the bearing block 12. The orientation and amplitude of the load are known and are modified during calibration of the gauge, to cover the usage range of the gauge.

The gauge that is mounted on the bearing block 12 emits information that will be analysed and processed to make it correspond to the stresses applied to the bearing block.

This stress is applied to the bearing 12 through stress application means 16 comprising an annular ring 18 forming an internal roller bearing ring that cooperates with the bearing block 12 and a set of balls 20 to form an assembly similar to a roller bearing.

The annular ring 18 comprises a conically-shape external radial end face 22 on which the balls 20 run. In this case, the conical face 22 is facing downwards. The angle of inclination of this conical face 22 is predefined so that the stress applied on the bearing block 12 has a predefined orientation.

The ring 18 can be replaced with another ring 18 with an external face 22 with a different angle of inclination in order to modify the orientation of the stress applied on the bearing block 12.

The stress application means 16 also comprise means 24 for generating the stress applied to the bearing block 12 that consists of applying an axial stress on the ring 18 that is oriented axially downwards and that is transmitted to the bearing block 12 through balls 20.

These means 24 for generating the axial stress comprise a tension shaft 26 coaxial with the principal axis A, the upper end 26a of which is connected to the ring 18 and the lower end 26b of which is connected to a tension device 28.

In this case, the tension device 28 consists of a tension jack, and it is connected to the lower end 26b of the tension shaft through a flexible link 30, for example comprising a torsion spring.

The upper end 26a of the shaft 26 is mounted free to rotate relative to the internal ring 18. A roller bearing with conical rollers 32 is inserted between the internal ring 18 and the upper end 26a of the shaft 26, to transmit firstly the axial stress and secondly to enable rotation of the internal ring 18 relative to the tension shaft 26.

The stress application means 16 also comprise means of driving the ring 18 in rotation about the principal axis A that comprises a rotation drive motor 34 that is arranged above the bearing block 12 and the ring 18, and a drive shaft 36 connecting the motor 34 to the ring 18.

The lower axial end 36a of the drive shaft 36 is connected to the ring through a slide type connection 38 that is capable of transmitting only the drive torque, which enables relative axial displacement of the ring 18 relative to the drive shaft 36.

In this case, the connection 38 is of the key type and according to one variant embodiment, the connection 38 is of the spline type, in other words the lower end 36a of the shaft 36 is splined and fits into a complementary splined orifice 40 connected to the ring 18.

Consequently, the connection between the ring 18 and the stress application means 16 consists of a connection between the ring 18 and each shaft 26, 36, that are arranged vertically on each side of the ring 18.

When the gauge is being calibrated, several rings 18 with different conical faces are used. The installation 10 comprises a drum 42 for supporting the ring 18, onto which the ring 18 is removably fixed and with which the shafts 26, 36 are connected, to limit the risks of misalignment of components.

The drum 42 comprises a first cylindrical portion of revolution 44 coaxial with the principal axis A, the upper axial end 46 of which is coupled with the lower end 36a of the rotational drive shaft 36, and the lower end 48 of which is connected to the upper end 26a of the tension shaft 26.

The upper axial end 46 of the cylindrical portion 44 supports a sleeve 52 used for coupling the drum 42 with the rotational drive shaft 36.

The lower axial end 48 of the cylindrical portion 44 comprises a lip 50 projecting radially inwards relative to the internal cylindrical wall of the cylindrical portion 44. The external ring 32a of the roller bearing 32 bears axially downwards in contact with the radial lip, to transmit the axial stress produced by the jack 28.

The internal ring 18 is mounted on the external wall of the cylindrical portion 44 and is axially compressed between an external annular rib 54 of the drum 42 that projects radially outwards from the external cylindrical face of the cylindrical portion, and an axial clamping ring 56 that is mounted removably on the cylindrical portion 44.

The annular rib 54 extends radially as far as a predefined radial end that enables the annular rib 54 to form an internal half-ring that cooperates with the internal ring 18 to form the internal part of the bearing block.

The main function of this internal half-ring formed by the annular rib 54 is to retain the balls 20 in position when the internal ring 18 is missing.

Thus, during a step in which two internal rings 18 are exchanged on the installation 10, all that is done is to disassemble and then reassemble the axial clamping ring 56 and uncouple the rotational drive shaft 36. This limits the installation components that are disassembled, thus improving the calibration of the gauge.

As already mentioned and as can be seen in the figures, the tension shaft 26 extends vertically downwards from the bearing block 12.

Thus, the table 14 on which the bearing block 12 is mounted comprises a central orifice 58 through which the tension shaft 26 passes, and it is located vertically at a distance from the ground.

The installation 10 also comprises a horizontal attachment plate 60 that is parallel to the support table 14 and that is located above and at a distance from the support table 14.

A set of four vertical uprights 62 fixed to the attachment plate 60 support the support table, forming a rigid support structure.

Figure 3:
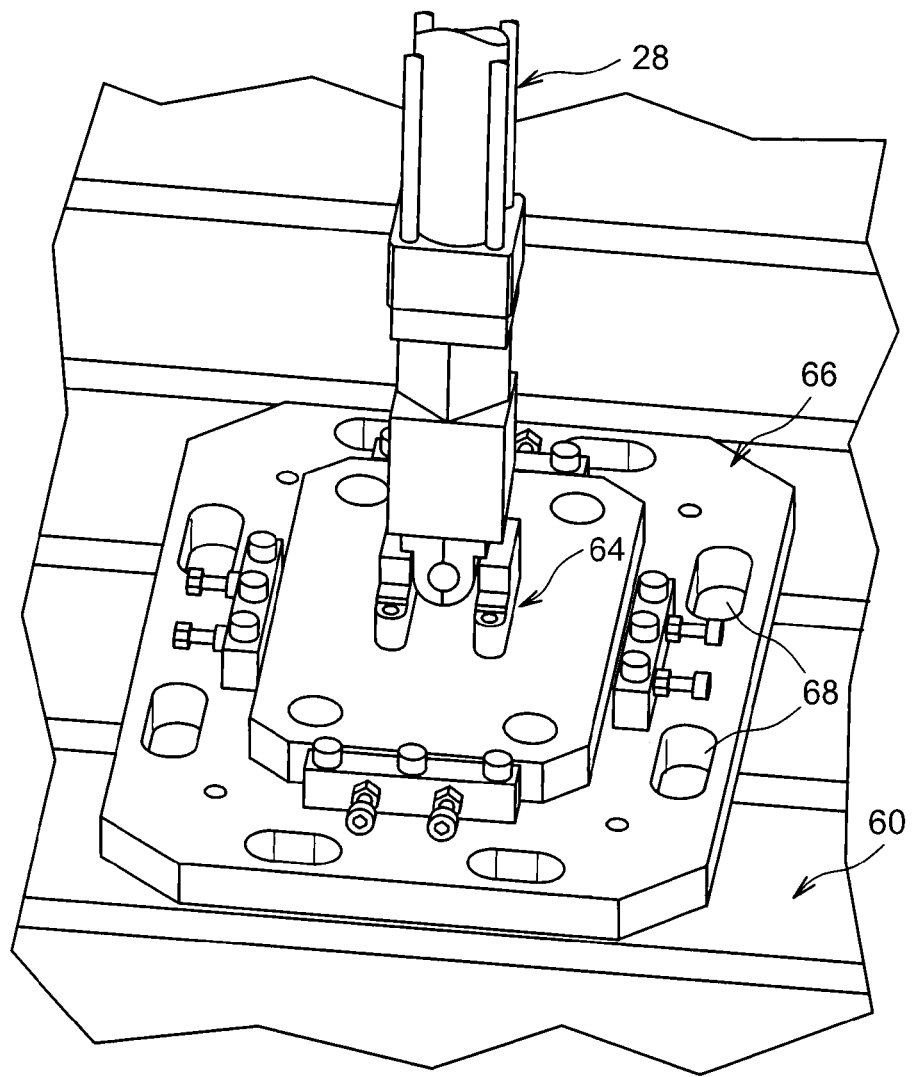
FIG. 3 is a perspective view of the assembly between the ball joint and the support plate.

As can be seen in FIG. 3, the attachment plate 60 is also connected to the lower end of the tension means 24 through a ball joint type connection 64.

The ball joint connection is mounted on the attachment plate 60 through a support plate 66, the horizontal position of which is adjustable relative to the attachment plate 60. The support plate 66 comprises oblong holes 68 for this purpose through which attachment screws (not shown) pass that cooperate with the attachment plate cleats (not shown).

The position of the support plate 66 is adjusted after assembly of the bearing block 12 on the support table 14 through a plumb line mounted coaxially with the bearing block 12.

Then, once the support plate 66 is in position, the tension means are mounted on the installation 10.

The orientation of the installation 10 with the principal axis A oriented vertically with reference to gravity, facilitates positioning of components of the installation 10 coaxially with the principal axis A.

This orientation also makes it possible to limit relative displacements of components of the installation 10, particularly when replacing the rings 18.

The invention claimed is:

1. An installation for calibration of a stress gauge for an external bearing block of a turbomachine roller bearing, said bearing block comprising a radially internal roller bearing race, the installation comprising:
    a support table on which the bearing block supporting the gauge is attached;
    a roller bearing ring that is mounted coaxial with the bearing block, that comprises a conical external face that is bearing in contact with the roller bearing race of the bearing block through several balls or rollers;
    a drive shaft driving the roller bearing ring in rotation about the principal axis of the bearing block;
    means for applying an axial stress to the bearing block;
    wherein the means for applying an axial stress comprises a support drum on which the roller bearing ring is removably fixed, that comprises means for coupling it in rotation with the drive shaft and connected with the axial stress application applying means.

2. The installation according to claim 1, wherein the support drum is mounted free to slide in the axial direction along the principal axis of the bearing block relative to the rotational drive shaft and is mounted free to rotate about the principal axis of the bearing block relative to the axial stress applying means.

3. The installation according to claim 1, wherein the means for coupling the support drum with the drive shaft are of a key or spline type.

4. The installation according to claim 1, wherein the connection of the support drum with the axial stress applying means comprises a roller bearing capable of resisting an axial load arranged between the support drum and the axial stress applying means.

5. The installation according to claim 1, wherein the support drum comprises a cylindrical portion coaxial with the principal axis of the bearing block, one end of which supports coupling means with the drive shaft and the second end of the cylindrical portion supports the connection with the axial stress applying means, and comprises an annular rib projecting radially outwards from the second end of the cylindrical portion, on which the roller bearing ring is mounted.

6. The installation according to claim 1, wherein the axial stress applying means comprise a tension jack that is arranged coaxially with the principal axis of the bearing block.

7. The installation according to claim 1, further comprising an attachment plate parallel to the support table, located at a distance from the support table, along the axial direction of the bearing block, that supports means of connection with the axial stress applying means.

8. The installation according to claim 7, wherein the means of connection with the axial stress applying means include a ball joint.

9. The installation according to claim 8, wherein the ball joint are mounted on the attachment table through a support plate for which the position on the attachment table can be adjusted.

10. The installation according to claim 7, wherein the support table and the attachment plate are oriented horizontally and the principal axis of the bearing block is oriented vertically, with reference to the gravity.

\* \* \* \* \*